US 6,604,599 B2

(12) United States Patent
Yamaguchi et al.

(10) Patent No.: US 6,604,599 B2
(45) Date of Patent: Aug. 12, 2003

(54) ANTI-SUBMARINE VEHICLE OCCUPANT RESTRAINT SYSTEM

(75) Inventors: Hiroyoshi Yamaguchi, Yokohama (JP); Hajime Shono, Kamakura (JP)

(73) Assignee: NHK Spring Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/825,740

(22) Filed: Apr. 3, 2001

(65) Prior Publication Data
US 2002/0003365 A1 Jan. 10, 2002

Related U.S. Application Data

(63) Continuation-in-part of application No. 09/525,980, filed on Mar. 15, 2000, now abandoned.

(30) Foreign Application Priority Data

| Mar. 15, 1999 | (JP) | 11-67669 |
| Mar. 15, 1999 | (JP) | 11-68356 |
| Mar. 26, 1999 | (JP) | 11-82799 |
| Mar. 26, 1999 | (JP) | 11-82802 |

(51) Int. Cl.[7] ............................................. B60N 2/42
(52) U.S. Cl. ................... 180/271; 296/68.1; 280/748; 297/216.1
(58) Field of Search ................... 280/748; 180/271; 297/216.1, 216.18, 216.19, 288.11; 296/68.1

(56) References Cited

U.S. PATENT DOCUMENTS

| 3,591,232 A | 7/1971 | Simon ..................... 297/216.1 |
| 3,858,930 A | 1/1975 | Calandra et al. ............ 296/68.1 |
| 3,917,031 A | 11/1975 | Doin et al. ............... 297/480 X |
| 4,225,184 A | 9/1980 | Strowick .................... 297/468 |
| 4,589,696 A | 5/1986 | Kanai et al. ................ 297/284 |
| 4,623,192 A | 11/1986 | Koide et al. ........ 297/284.11 X |

(List continued on next page.)

FOREIGN PATENT DOCUMENTS

| DE | 3631 881 A1 | * | 4/1988 |
| DE | 3841688 A1 | * | 6/1990 |
| DE | 42 12 254 C1 | * | 4/1993 |
| DE | 4423957 A1 | | 1/1996 |
| DE | 19707998 A1 | | 9/1998 |
| EP | 0306299 A1 | | 3/1989 |
| EP | 0965479 A2 | | 12/1999 |
| FR | 2747080 A1 | * | 10/1997 |
| GB | 2330334 A | | 4/1999 |
| GB | 2337726 A | | 12/1999 |
| GB | 2342076 A | | 4/2000 |
| JP | 58-53525 A | | 3/1983 |
| JP | 58-53525 A | | 3/1983 |
| JP | 1-275230 A | | 11/1989 |
| JP | 1-275230 U | | 11/1989 |
| JP | 2-149328 U | | 12/1990 |
| JP | 3-61440 U | | 6/1991 |
| JP | 3-227745 A | | 6/1991 |

(List continued on next page.)

Primary Examiner—Paul N. Dickson
Assistant Examiner—Ruth Ilan
(74) Attorney, Agent, or Firm—MacPherson Kwok Chen & Heid LLP

(57) ABSTRACT

Provided is a vehicle occupant restraint system which can reduce the load on the chest and head of the vehicle occupant in an impact situation while reliably preventing the submarine phenomenon. By restraining the pelvis and the adjacent parts of the vehicle occupant before the load is applied to the chest and head, the load is more favorably distributed, and the critical parts are favorably protected. This can be accomplished by activating a restraining member for raising an appropriate part of the vehicle seat immediate upon detecting an impact.

15 Claims, 8 Drawing Sheets

U.S. PATENT DOCUMENTS

| | | | |
|---|---|---|---|
| 4,652,049 A | 3/1987 | Maruyama et al. | 297/284.11 X |
| 4,705,296 A | 11/1987 | Andersson et al. | 280/806 |
| 4,767,155 A | 8/1988 | Kousaka et al. | 297/219 |
| 5,125,472 A * | 6/1992 | Hara | 180/271 |
| 5,152,552 A | 10/1992 | Ikegaya | 297/480 X |
| 5,186,494 A | 2/1993 | Shimose | 280/806 |
| 5,282,672 A | 2/1994 | Borlinghaus | 297/468 |
| 5,288,105 A | 2/1994 | Ikegaya et al. | 280/806 |
| 5,340,185 A * | 8/1994 | Vollmer | 296/68.1 |
| 5,374,105 A | 12/1994 | Kracht et al. | 297/216.1 |
| 5,403,037 A | 4/1995 | Föhl | 280/806 |
| 5,405,180 A | 4/1995 | Föhl | 297/478 |
| 5,449,214 A | 9/1995 | Totani | 296/68.1 |
| 5,451,094 A | 9/1995 | Templin et al. | 297/216.7 |
| 5,490,706 A | 2/1996 | Totani | 296/68.1 |
| 5,556,159 A | 9/1996 | Canteleux | 297/216.1 |
| 5,556,160 A | 9/1996 | Mikami | 297/216.1 |
| 5,647,628 A * | 7/1997 | Pires et al. | 188/82.7 |
| 5,647,635 A | 7/1997 | Aumond et al. | 297/284.11 |
| 5,695,242 A * | 12/1997 | Brantman et al. | 280/730.1 |
| 5,697,674 A * | 12/1997 | Aufrere et al. | 297/344.15 |
| 5,908,219 A * | 6/1999 | Bohmler | 297/216.1 |
| 5,984,357 A | 11/1999 | Yasuda et al. | 280/806 |
| 6,048,034 A | 4/2000 | Aumont et al. | 297/478 |
| 6,050,635 A | 4/2000 | Pajon et al. | 297/216.1 |
| 6,113,145 A | 9/2000 | Evans | 297/806 |
| 6,113,185 A * | 9/2000 | Yamaguchi et al. | 280/748 |
| 6,131,951 A | 10/2000 | Chicken et al. | 280/806 |
| 6,164,700 A | 12/2000 | Masuda et al. | 280/806 |

FOREIGN PATENT DOCUMENTS

| | | | |
|---|---|---|---|
| JP | 3-121947 U | | 12/1991 |
| JP | 4-93222 U | | 8/1992 |
| JP | 05229378 A | | 9/1993 |
| JP | 5-229378 A | | 9/1993 |
| JP | 5-286387 A | * | 11/1993 |
| JP | 7-81466 | | 3/1995 |
| JP | 07081466 A | | 3/1995 |
| JP | 10181527 A | | 7/1998 |
| JP | 10181529 A | | 7/1998 |
| JP | 2001-180409 | | 7/2001 |
| KR | 97-36691 A | * | 7/1997 |
| KR | 97-36695 A | * | 7/1997 |

* cited by examiner

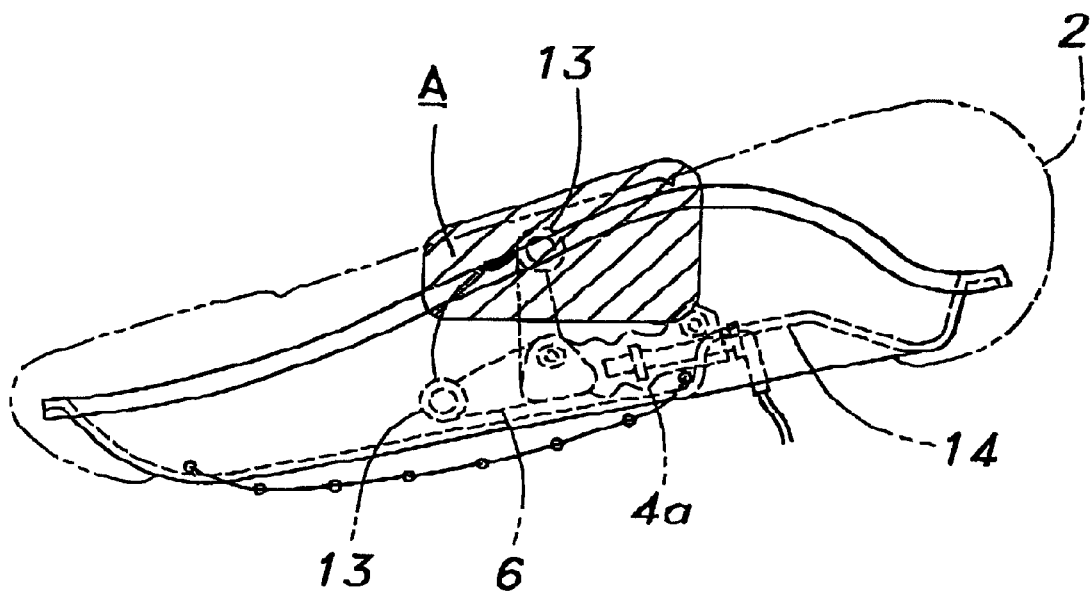

ANTI-SUBMARINE VEHICLE OCCUPANT RESTRAINT SYSTEM

CROSS REFERENCE TO RELATED APPLICATIONS

Copending U.S. patent applications Ser. No. 09/334,116 filed Jun. 15, 1999, and Ser. Nos. 09/525,994, 09/526,405 and 09/526,650 all filed Mar. 15, 2000 are directed to similar subject matters, and the contents of these applications are incorporated herein by reference. This application is a continuation-in-part application of Ser. No. 09/525,980 filed Mar. 15, 2000 which is now abandoned.

TECHNICAL FIELD

The present invention relates to a vehicle occupant restraint system which is adapted to prevent a vehicle occupant from slipping forward under the seat belt in case of an impact situation such as a vehicle crash.

BACKGROUND OF THE INVENTION

A seat belt is widely used for restraining a vehicle occupant to prevent the vehicle occupant from being thrown forward in case of an impact situation such as a vehicle crash, and hitting the instrumental panel or the steering wheel. An inflatable air bag is being used in an increasing number of vehicles to even further enhance the effectiveness of the seat belt. However, depending on the way the vehicle occupant is seated, the vehicle occupant could slip forward under the seat belt if the seat belt fails to restrain the pelvis of the vehicle occupant in an effective way. This is called "submarining", and substantially impairs the effectiveness of the seat belt.

It was therefore proposed to provide a moveable member inside the seat bottom so as to be deployed and restrain the thighs of the vehicle occupant in case of a vehicle crash. Such a thigh restraining member may be actuated typically by using a pyrotechnic actuator (see Japanese patent laid open publication No. 01-122504).

In such a vehicle occupant restraining device, typically, the front end of the seat bottom is raised so as to raise the knees of the vehicle occupant. This prevents the knees of the vehicle occupant from hitting the dashboard or other members opposing the vehicle occupant at the time of a vehicle crash, but the hip of the vehicle occupant inevitably slips forward to a certain extent and the reduction in the effectiveness of the vehicle seat belt due to the submarine phenomenon was not entirely avoided.

In view of minimizing the maximum value of the deceleration acting on the vehicle occupant at the time of a vehicle crash, it is desirable to transmit the deceleration to the vehicle occupant as soon as possible immediately following the occurrence of a vehicle crash. Because the integral value of the deceleration of the vehicle occupant from the occurrence of a vehicle crash to a complete stop is equal to the speed of the vehicle immediately preceding the vehicle crash, and is therefore fixed, any delay in the transmission of deceleration to the vehicle occupant needs to be made up for by a high level of deceleration in a later stage of the vehicle crash. In an actual vehicle crash, such a delay in the transmission of deceleration to the vehicle occupant is substantial because of the slack that may be present in the seat belt and the property of the seat belt to elongate when subjected to a tension.

On the other hand, if the restraining capability of the seat belt is simply increased by using a pretensioner device or other means for removing the slack and/or prohibiting the elongation of the seat belt, the upper part of the vehicle occupant such as the head and chest of the vehicle occupant are subjected to an excessive level of deceleration, and this is not desirable in view of minimizing the injury to the vehicle occupant.

BRIEF SUMMARY OF THE INVENTION

In view of such problems of the prior art, a primary object of the present invention is to provide an anti-submarine vehicle occupant restraint system which can reduce the load on the chest and head of the vehicle occupant in an impact situation.

A second object of the present invention is to provide a vehicle occupant restraint system which can reliably prevent the submarining of the vehicle occupant at the time of a vehicle crash.

A third object of the present invention is to provide such a vehicle occupant restraint system which is simple in structure.

According to the present invention, such objects can be accomplished by providing a vehicle occupant restraint system for restraining a lower part of a vehicle occupant in a vehicle crash situation, comprising: a vehicle seat incorporated with a seat belt; a sensor for detecting an impact; a restraining member supported by a vehicle seat so as to be moveable from a retracted position concealed inside the seat to a deployed position projecting upward from the retracted position to restrain a forward movement of a hip area of the vehicle occupant; and a power actuator provided in association with the vehicle seat for actuating the restraining member to the deployed position according to a detection signal from the sensor; the power actuator being adapted to deploy the restraining member substantially before the seat belt effectively restrains the vehicle occupant.

Upon conducting extensive research, the inventors have discovered that the injury to the vehicle occupant is often caused by a high level of acceleration that is applied to the vulnerable part of the vehicle occupant such as the chest and head, and that the mechanical strength of the waist of a vehicle occupant is high enough to withstand the forward force at the time of an impact with a certain margin. It was therefore concluded that the injury to the vehicle occupant can be minimized by appropriately selecting the force and timing of restraining the pelvis and the adjacent parts (such as thighs and hip) relative to the timing of the seat belt restraining the chest area of the vehicle occupant.

Because the load acting on the vehicle occupant is thereby more distributed, the maximum load on the critical parts of the human body such as the chest and head can be reduced. In particular, the pelvis or waist and the parts adjacent thereto have a relatively high mechanical strength as compared to other parts of the human bone structure, and are relatively free from load at the time of an impact if the vehicle occupant is seated so that an early increase in the load on this part would not create any significant problem.

Preferably, a vertical height of the restraining member at the deployed position is equal to or higher than an ischium of the vehicle occupant seated in the seat. Thereby, the forward movement of the hip of the vehicle occupant can be effectively restrained, and the desired timing for restraining the hip of the vehicle occupant can be achieved.

According to a preferred embodiment of the present invention, a vertical height of the restraining member at the deployed position is at least 20 mm higher than an ischium of the vehicle occupant seated in the seat, and projects 20 mm or less into the part of the thighs of the vehicle occupant immediately above the restraining member at the deployed position.

It was also found to be desirable to restrain a part of the thighs of the vehicle occupant which is relatively close to the pelvis or more particularly the ischium of the vehicle occupant. According to a preferred embodiment based upon such a recognition, the restraining member at the deployed position is higher than an ischium of the vehicle occupant seated in the seat, and is 80 mm to 220 mm ahead of the ischium of the vehicle occupant.

The power actuator can be made highly compact when it consists of a pyrotechnic power actuator comprising a cylinder, a piston received therein, and a propellant received in the cylinder for rapidly increasing an inner pressure of the cylinder so as to produce a thrust that will rapidly push the piston out of the cylinder. To evenly apply a restraining force to the thighs of the vehicle occupant, and ensure a necessary mechanical strength without requiring any massive components, the restraining member may comprise a laterally extending main member supported by free ends of a pair of arms having base ends pivotally supported by a seat frame.

Typically, the pivotally supported base end of each arm is located behind the main part of the restraining member, and the power actuator is located behind of the main part of the restraining member.

Because the restraining member is desired to continue to apply a restraining force to the vehicle occupant for a certain period of time following a vehicle crash, it is desirable to provide a one-way lock mechanism in the power actuator or other parts of the restraint system for substantially preventing a reversing movement of the restraining member once it is deployed.

The orientation of the arm can be reversed, and by so doing, it is possible to retain the restraining member at its deployed position once it is deployed without requiring any special arrangement because the inertia acting on the vehicle occupant urges the restraining member toward its deployed position as long as it exists.

BRIEF DESCRIPTION OF THE DRAWINGS

Now the present invention is described in the following with reference to the appended drawings, in which:

FIG. 5b is a sectional view taken along line IIIb—IIIb of FIG. 5a;

FIG. 9 is a view similar to FIG. 2 showing an alternate embodiment of the present invention.

DETAILED DESCRIPTION OF THE PREFERRED EMBODIMENTS

Figure 1:
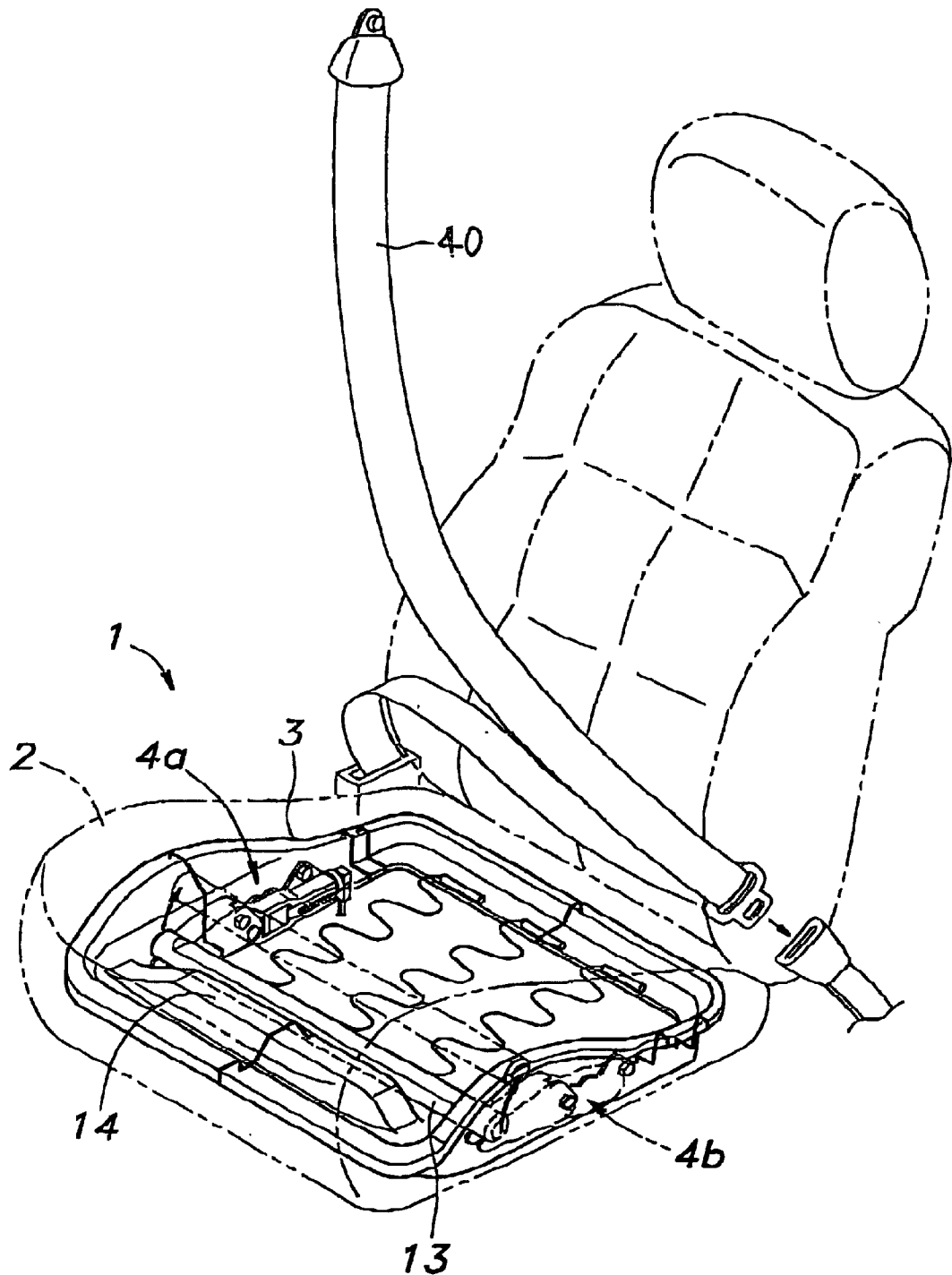
FIG. 1 is perspective see-through view of a vehicle seat embodying the present invention.
Figure 2:
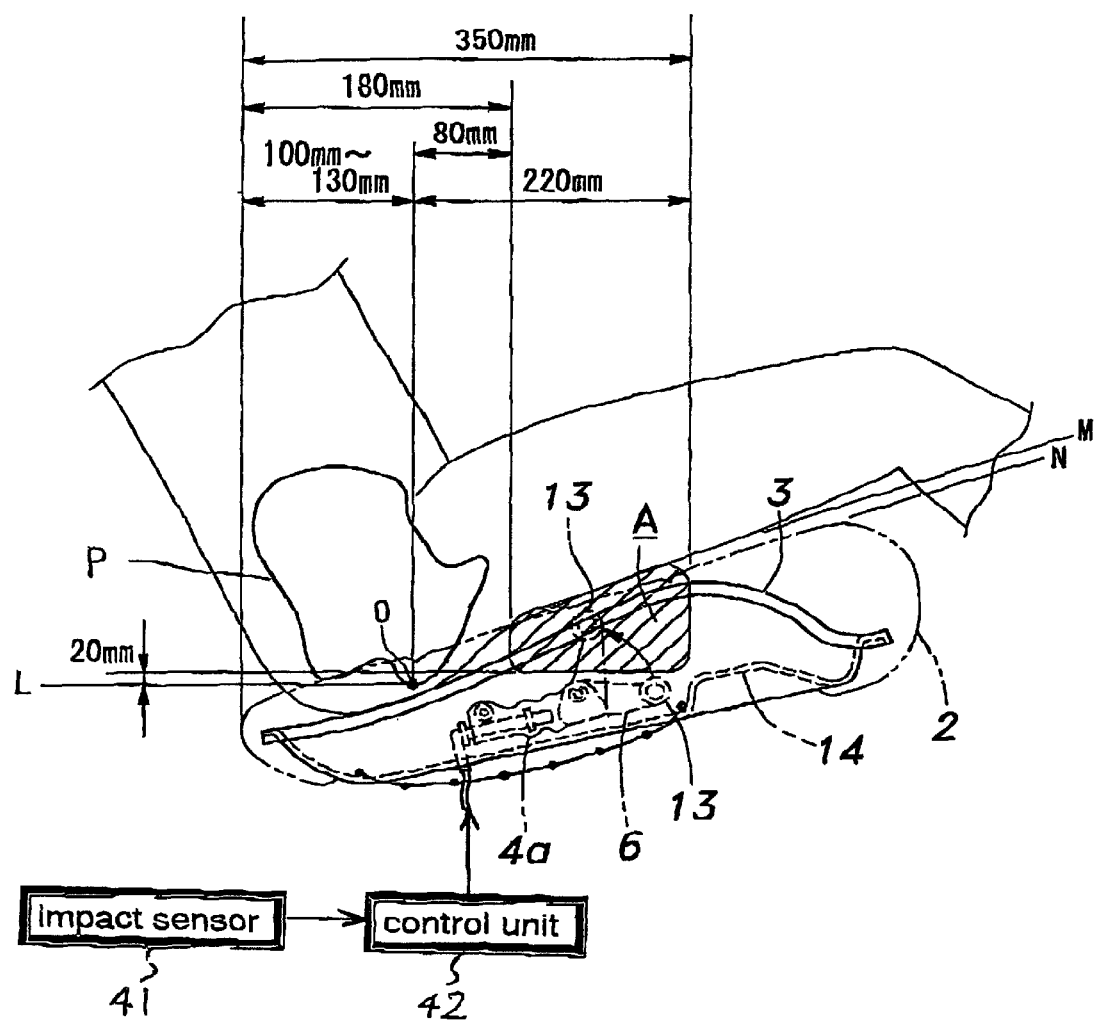
FIG. 2 is a schematic side view of the vehicle seat.

FIGS. 1 and 2 show a vehicle seat 1 which includes a seat bottom 2, and is fitted with a seat belt 40. The seat bottom 2 comprises a rectangular seat frame 3 made of steel which is padded with foamed urethane and other suitable materials. The seat bottom 2 is incorporated with a vehicle occupant restraint system 4 embodying the present invention which includes an active subassembly 4a and a passive subassembly 4b, and a restraining member 13 extending between the working ends of the active and passive subassemblies 4a and 4b. The active and passive subassemblies 4a and 4b are fixedly secured to either side of the seat frame 3. The occupant restraint system 4 is adapted to raise the restraining member 13 at the time of a vehicle crash to restrain the thighs of the vehicle occupant, and prevent the forward movement of the hip and waist of the vehicle occupant. Preferably, the restraining member 13 is provided with a suitable deformability to absorb the impact of the vehicle crash in an optimal fashion.

The seat frame 3 is formed with a projection 14 provided immediately in front of the restraining member 13 and defining an upper surface substantially flush with the upper surface of the restraining member 13 so that the restraining member 13, in its retracted position, would not apply any undesirably localized pressure to the thighs of the vehicle occupant seated in this seat.

As best shown in FIG. 2, the restraint system 4 is disposed in such a manner that the restraining member 13, in its deployed position, engages a part of the vehicle occupant which is somewhat offset from a mid point of the thigh bones toward the hip joints. It was found experimentally by using dummies (HYBRID-III 50th percentile male dummies) that the vehicle occupant can be effectively restrained by selecting the deployed position of the restraining member 13 to be somewhat offset from a mid point of the thigh bones toward the hip joints, and higher than the ischium O or the lowermost part of the pelvis P of the vehicle occupant.

If the deployed position of the restraining member 13 is more forward than the mid point of the thighs of the vehicle occupant, the restraining member 13 is unable to restrain the hip of the vehicle occupant at an early enough timing to avoid an excessive deceleration to be applied to the head and chest of the vehicle occupant by the restraining force of the seat belt. The desired range of the deployed position of the restraining member 13 extends from 80 mm to 220 mm as measured from the ischium O of the vehicle occupant seated in the seat. Because the ischium O of the vehicle occupant is typically in the range of 100 mm to 130 mm ahead of the rear end of the seat bottom 2, the desirable region corresponds to the range of 180 mm to 350 mm as measured from the rear end of the seat bottom.

The fore-and-aft length of a vehicle seat bottom is typically in the range of 530 to 580 mm, the range of 180 mm to 350 mm corresponds to about 34% to 66% of the fore-and-aft length of the seat bottom as measured from the rear end of the seat bottom when the fore-and-aft length of the seat bottom is 530 mm, and to about 31% to 60% of the fore-and-aft length of the seat bottom as measured from the rear end of the seat bottom when the fore-and-aft length of the seat bottom is 580 mm.

The vertical height of the restraining member at its deployed position should be at least 20 mm higher than the level L of the ischium O of the vehicle occupant seated in the seat. If it is less than 20 mm, the restraining member is unable to effectively restrain the forward movement of the hip or pelvis P of the vehicle occupant. On the other hand, it is also desirable to control the vertical lift of the restraining member so as to avoid any inadvertent injury to the thighs of the vehicle occupant, and should be 20 mm or less above the level M of the lower surface of the part of the thighs of the vehicle occupant immediately above the restraining member.

The desired area for the deployed position of the restraining member based on the foregoing considerations is indicated by the hatched area A in FIG. 2.

Based on the considerable that a child seat may be placed on the seat bottom or a child whose feet do not reach the floor may be seated on the seat bottom, the projection of the restraining member 13 should be 10 mm or less as measured from the part of the upper surface N of the seat bottom immediately above the restraining member.

Figure 3A:
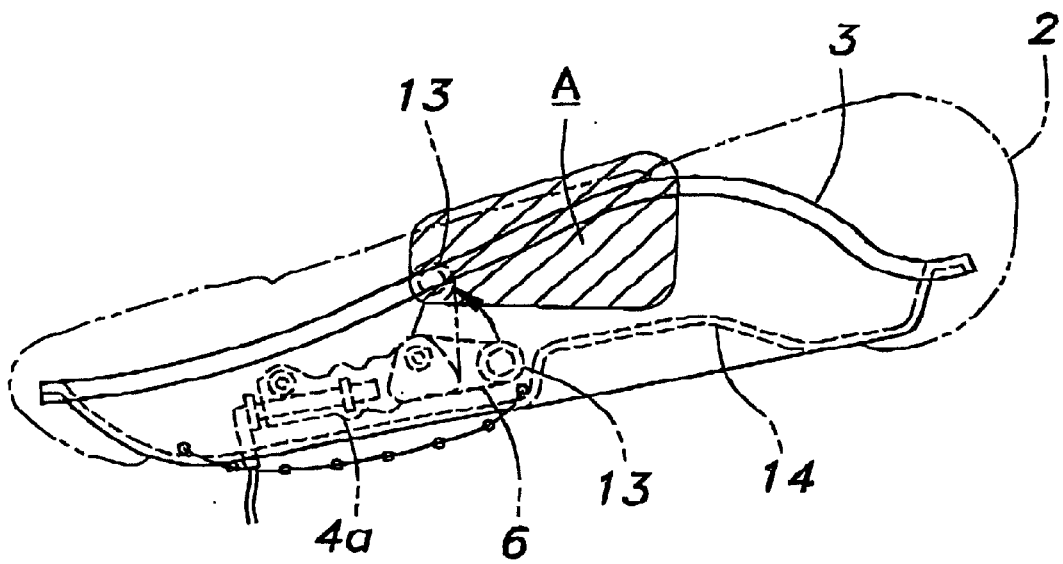
FIGS. 3a and 3b are views similar to FIG. 2 showing two different modes of positioning the occupant restraining member.
Figure 3B:
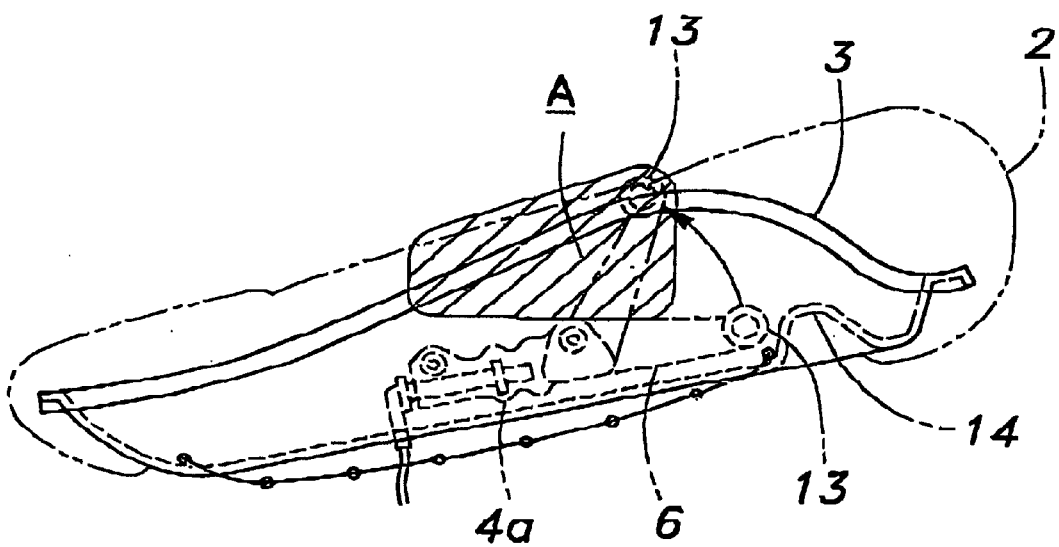

FIG. 3a shows an example in which the deployed position of the restraining member 13 is at the rear extreme of the desirable region indicated by the hatched area A, and FIG. 3b shows an example in which the deployed position of the restraining member 13 is at the front extreme of the desirable region A. The shape and size of the projection 14 should be selected according to the particular position and size of the restraining member.

Figure 4:
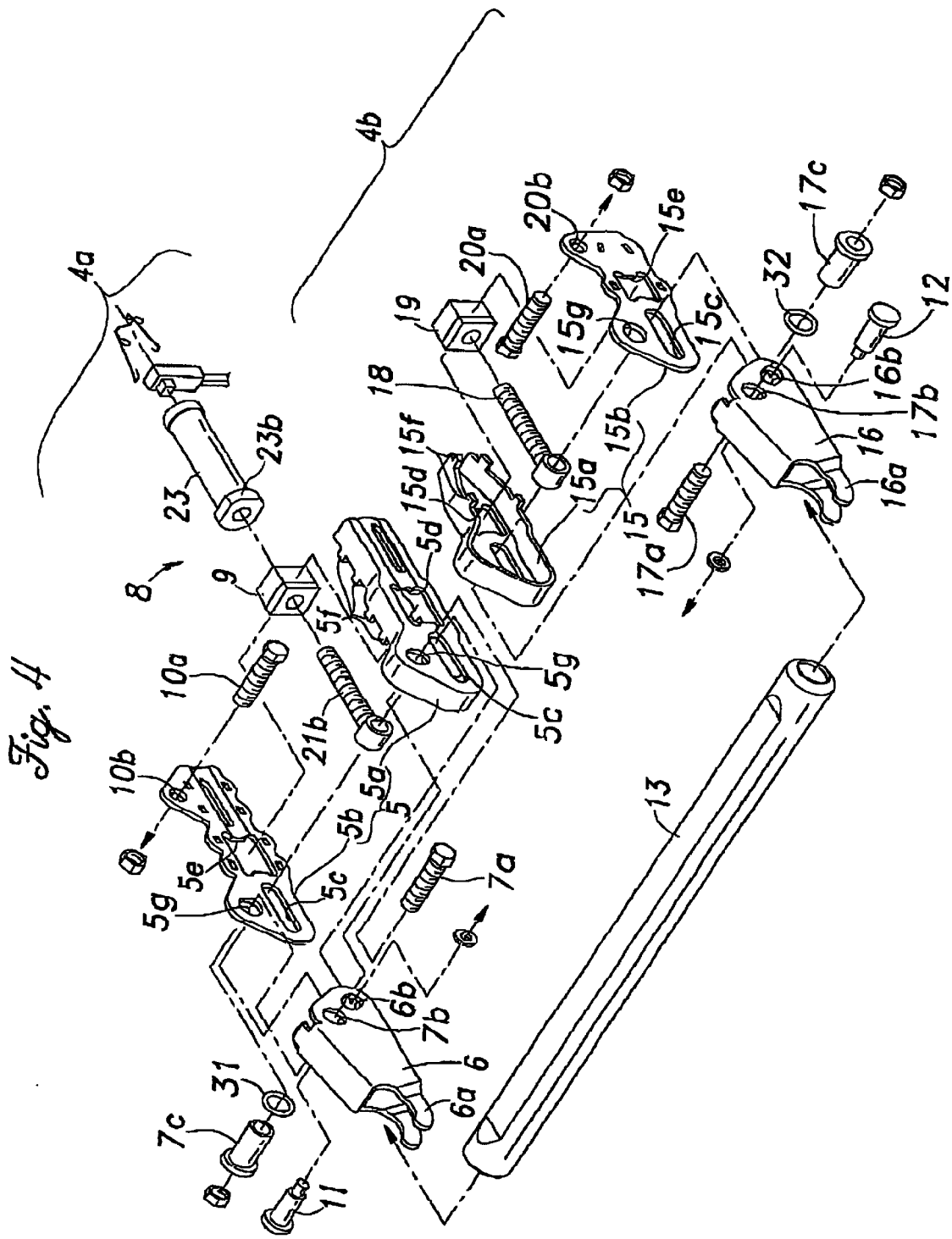
FIG. 4 is an exploded perspective view of the vehicle occupant restraint system.
Figure 5A:
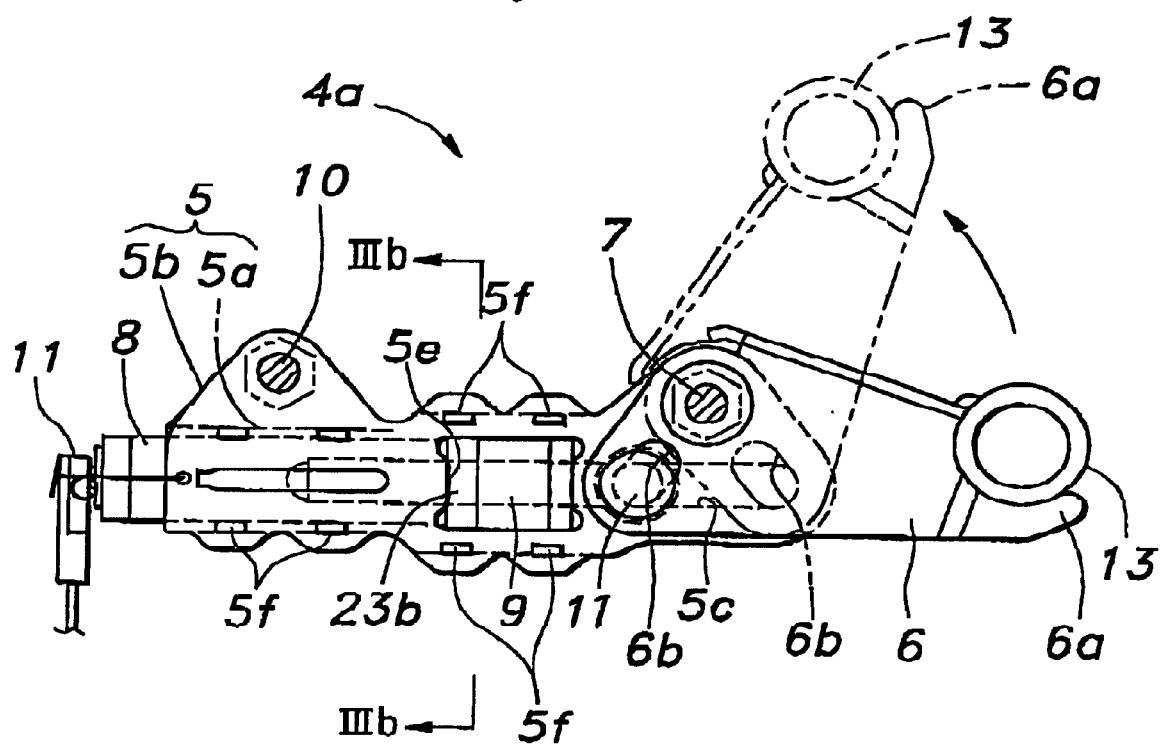
FIG. 5a is a side view of the active side of the arrangement for actuating the occupant restraining member.

Referring to FIGS. 4 and 5a, the active subassembly 4a, which is attached to the right side of the seat frame 3 in this embodiment, comprises an elongated casing 5 having a rectangular cross section, an arm 6 pivotally attached to a front end of the casing 5 via a pivot collar 7c passed through holes 5g and 7b formed in the casing 5 and arm 6 so as to be rotated vertically, and a power actuator 8 received in the casing 5 and adapted to actuate the arm 6 when required. One end of the restraining member 13 is welded to a free end 6a of the arm 6.

The power actuator 8 is provided with a one-way lock mechanism 9 which retains the working end of the power actuator (or a piston rod 21b of a piston main body 21a received in the power actuator 8 as described hereinafter) at its deployed position once the power actuator 8 is activated. The free end of the piston rod 21b is connected to the arm 6 via a pin 11 passed through a slot 6b formed in the arm 6 at a position offset from the pivot collar 7. The pin 11 for actuating the arm 6 is also passed through a pair of horizontal slots 15c formed on either side of the casing 5 so that the piston rod 21b may be guided linearly along a central axial line of the cylinder 23 of the power actuator 8. A rubber ring 31 is interposed between a flanged head of the pivot collar 7c and the opposing surface of the casing 5 to accommodate a slight axial displacement of the pivot collar 7c. Such an axial displacement of the pivot collar 7c creates a dimensional tolerance for the lateral dimension of the seat frame 3.

The casing 5 comprises a main body 5a having an open right side, and a lid member 5b closing the open right side of the main body 5a. In the assembling process, the power actuator 8 and the one-way lock mechanism 9 are introduced into the main body 5a of the casing 5 from sideways, and the lid member 5b is then placed over the open right side of the main body 5a. The lid member 5b is secured to the main body 5a by crimping tabs 5f formed in the casing main body 5a and passed into corresponding slots formed in the lid member 5b.

Figure 5B:
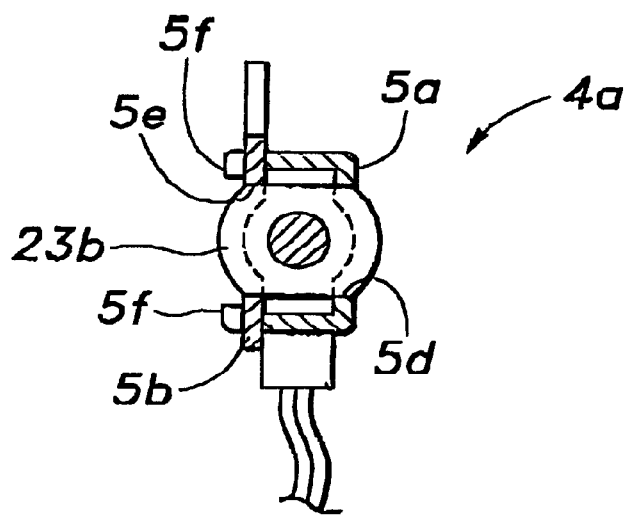

As best shown in FIG. 5b, the power actuator 8 includes a cylinder 23 having a circular cross section. The corresponding parts of the casing main body 5a and lid member 5b are suitably curved in cross section so as to conform to the outer profile of the cylinder 23 of the power actuator 8. Furthermore, the casing main body 5a and lid member 5b are provided with rectangular openings 5d and 5e, respectively, so as to receive and engage a flange 23b of the cylinder 23. Because the casing main body 5a and lid member 5b are curved in cross section, the edges of the openings 5d and 5e engaging the flange 23b are also curved so that the flange 23b is supported by the edges of the opening 5d and 5e evenly, symmetrically and over a large area. Therefore, the cylinder 23 can be supported in a secure manner, particularly when the actuator 8 is actuated and the rear surface of the flange 23 is pushed against the corresponding edge of the openings by the reaction caused by the activation of the power actuator 8. The casing 5 is attached to the seat frame 3 by a pair of threaded bolts 7a and 10a, one 7a passed through the pivot collar 7c pivotally supporting the arm 6, and the other 10a passed through an opening 10a provided in the rear end of the lid member 5b.

Figure 6:
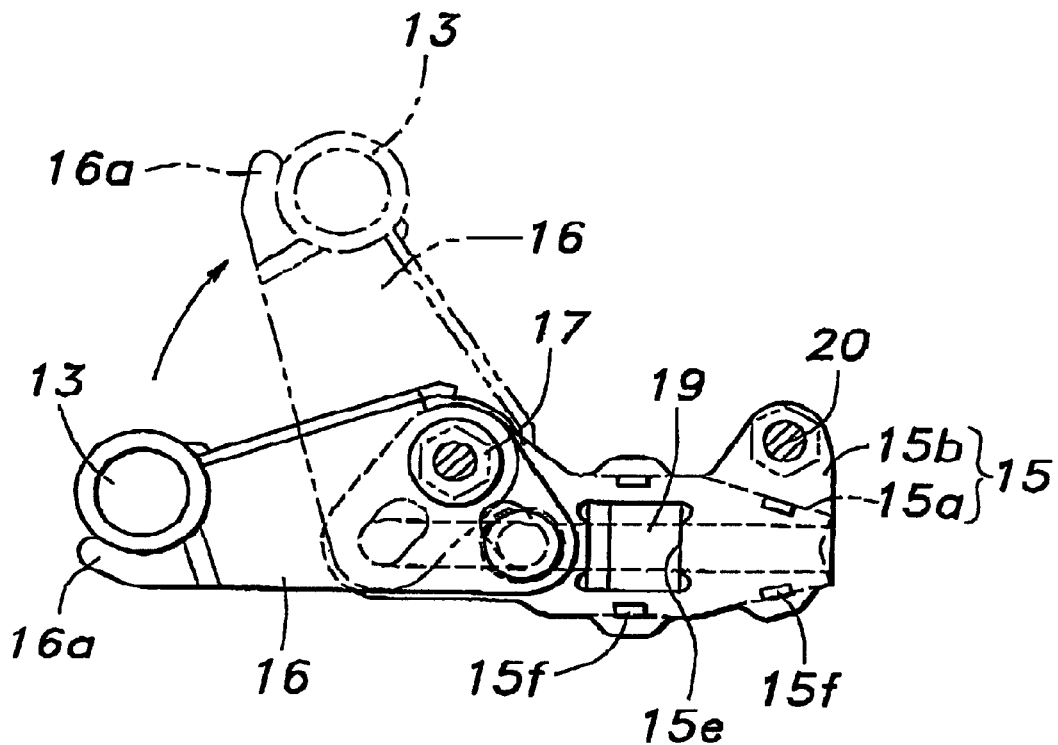
FIG. 6 is a side view showing the passive side of the arrangement for actuating the occupant restraining member.

Referring to FIG. 6, the passive subassembly 4b comprises an elongated casing 15 having a rectangular cross section, an arm 16 pivotally attached to a front end of the casing 15 via a pivot collar 17 so as to be rotated vertically, a rod 18 similar to the piston rod 21b having a front end pivotally supported by a pin 12 received in a horizontal slot 15c formed in the arm 16, and a one-way lock mechanism 19, which is also similar to the one-way lock mechanism 9 of the active subassembly 4a, is attached to the casing 15 via rectangular openings 15d and 15e formed in the casing 15 similar to the openings 5d and 5e of the active subassembly 4a. The rod 18 is provided with circumferential grooves or a threaded portion so as to favorably cooperate with the one-way lock mechanism 19. The other end of the restraining member 13 is welded to a free end 16a of the arm 16.

The casing 15 of the passive subassembly 4b also comprises a main body 15a having an open left side, and a lid member 15b closing the open left side of the main body 15a. In the assembling process, the one-way lock mechanism 19 is introduced into the main body 15a of the casing 15 from sideways, and the lid member 15b is then placed over the open left side of the main body 15a. The lid member 15b is secured to the casing main body 15a by crimping tabs 15f formed in the casing main body 15a and passed into corresponding slots formed in the lid member 15b. The casing 15 is attached to the seat frame 3 by a pair of threaded bolts 17a and 20a, one 17a passed through the pivot collar 17c pivotally supporting the arm 16, and the other 20a passed through an opening 20b provided in the rear end of the lid member 15b. A rubber ring 32 is interposed between a flanged head of the pivot collar 17c and the opposing surface of the casing 15 to accommodate a slight axial displacement of the pivot collar 17c. Such an axial displacement of the pivot collar 17c creates a dimensional tolerance for the lateral dimension of the seat frame 3. In short, the passive subassembly is similar to the active subassembly except for the absence of the power actuator.

Figure 7:
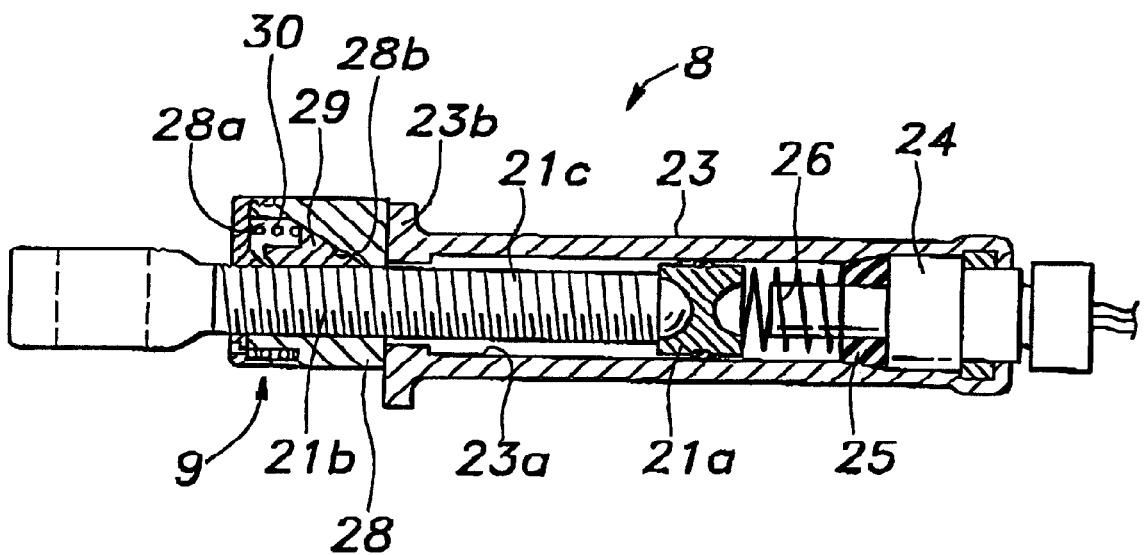
FIG. 7 is a sectional view of the pyrotechnic actuator for actuating the occupant restraining member.

Referring to FIG. 7, the power actuator 8 comprises a cylinder 23 which is received and fixed in the casing 5 of the active subassembly 4a, a piston main body 21a received in an inner bore 23a of the cylinder 23, and a gas generator 24 received in the part of the cylinder 23 more toward the base end thereof than the piston main body 21a. A compression coil spring 26 is interposed between the piston main body 21a and the gas generator 24 via a resilient seal member 25 to normally urge the piston main body 21a in the direction of activation (projecting direction). The seal member 25 may consist of any suitable kind such as an O-ring which has a resiliency in the axial direction, and is effective in preventing the leakage of generated gas.

The front end of the power actuator 8 is provided with the one-way lock mechanism 9. The one-way lock mechanism 9 comprises a housing 28 surrounding the piston rod 21b and fixedly attached to the casing 5, and the housing 28 accommodates therein an engagement piece 19, and a compression coil spring 30 urging the engagement piece 19 toward the base end of the piston rod 21b or the cylinder 23. The engagement piece 19 is gradually reduced in outer diameter from the free end of the piston rod 21b to the base end thereof. The inner bore of the housing 28 includes a large diameter portion 28a and a tapered portion 28b which is gradually reduced in inner diameter away from the large diameter portion 28a. Therefore, in the state illustrated in FIG. 7, the engagement piece 29 is pressed onto the tapered portion 28b of the housing 28 and engages the outer circumferential surface of the piston rod 21b under the biasing force of the spring 30. As the piston rod 21b moves in the projecting direction, the engagement piece 29 is dragged in the projecting direction of the piston rod 21b against the spring force of the spring 30. As it moves toward the large diameter portion 28a, the engagement piece 29 moves away from the piston rod 21b so that the piston rod 21b is allowed to move freely.

When the piston rod 21b is pushed back into the cylinder 23, the engagement piece 29 moves toward the tapered portion 28b under the spring force of the spring 30 and engages the outer circumferential surface of the piston rod 21b so that the piston rod 21b is securely fixed relative to the cylinder 23. The inner circumferential surface of the engagement piece 29 is provided with annular grooves or thread grooves while the outer circumferential surface of the piston rod 21b is provided with corresponding annular grooves or thread grooves 21c. Therefore, as the piston rod 21b is pushed into the cylinder 23, the inner circumferential surface of the engagement piece 29 engages the outer circumferential surface of the piston rod 21b so that these two parts are firmly retained to each other, and are kept at a fixed position.

In the embodiment described above, there was only one engagement piece, but it is also possible to provide two or more similar engagement pieces around the piston rod 21b.

The gas generator 24 is electrically connected to a control unit 42 (FIG. 2) which activates the gas generator 24 by receiving a signal from an impact sensor 41 upon detection of a deceleration indicative of a vehicle crash. Deceleration sensors for such a purpose are well known in the art, and reference should be made to available prior art references for more details.

Now the mode of operation of this embodiment is described in the following. First of all, under a normal condition, because of the engagement between the inner circumferential surface of the engagement piece 29 and the thread grooves 21c on the outer circumferential surface of the piston rod 21b, the piston main body 21a, the arm 6 engaged thereby, and the restraining member 13 are kept stationary and prevented from any inadvertent movement. However, when a vehicle crash is detected by the impact sensor 41, gas is generated from the gas generator 24, and the resulting rapid increase in the inner pressure of the cylinder 23 instantaneously pushes out the free end of the piston main body 21a along with the piston rod 21b from the cylinder 23. As a result, the arm 6 attached to the free end of the piston rod 21b turns in counter clockwise direction as indicated by the imaginary lines in FIG. 5a, and the restraining member 13 is raised so that the submarining of the vehicle occupant can be prevented. The deployment of the restraining member 13 is typically accompanied by the corresponding deformation or destruction of the cushion members of the seat bottom 2. Even after the generation of gas from the gas generator 24 has ceased, and the drive force of the power actuator 8 has been lost, the raised restraining member 13 would not come down, and maintains the action to prevent submarining by virtue of the one-way lock mechanisms 9 and 19.

The deployment of the restraining member directly prevents the forward movement of the hip and waist of the vehicle occupant at the time of a vehicle crash, and this causes an early buildup of deceleration in the hip and waist of the vehicle occupant. This indirectly causes the corresponding build up of deceleration in the chest and head of the vehicle occupant. By thus causing the vehicle occupant, in particular to the head and chest of the vehicle occupant which are known to be more vulnerable than the hip and waist of the vehicle occupant, to experience the vehicle deceleration from an early phase of a vehicle crash, it is possible to minimize the maximum deceleration that is applied to the head and chest of the vehicle occupant.

As the vehicle occupant starts to be thrown forward, the waist or the pelvis of the vehicle occupant is relatively immediately restrained and the deformation of the restraining member absorbs a certain amount of the impact energy of the vehicle occupant (about 30 to 40 ms after the impact). The subsequent forward movement of the vehicle occupant causes the tension of the seat belt to reach its maximum level, or the pelvis to be fully restrained, and the pelvis experiences the maximum acceleration level (40 to 50 ms after the impact). The maximum acceleration level on the head occurs thereafter (50 to 60 ms after the impact). In this regard, it is important to deploy the restraining member substantially before the belt effectively restrains the vehicle occupant. This can be accomplished by restraining an appropriate part of the thighs of the vehicle occupant at an appropriate timing as discussed above.

Figure 8A:
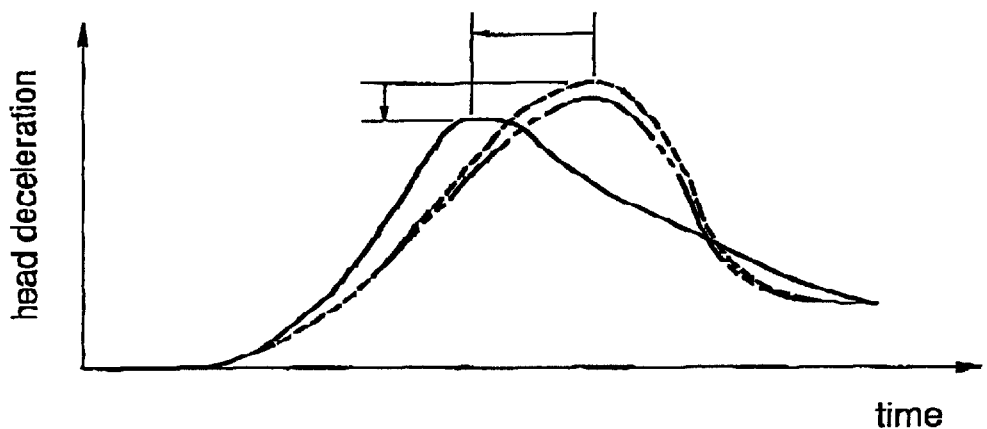
FIGS. 8a, 8b and 8c are graphs showing the levels of deceleration acting on the head, chest and hip of the vehicle occupant.
Figure 8B:
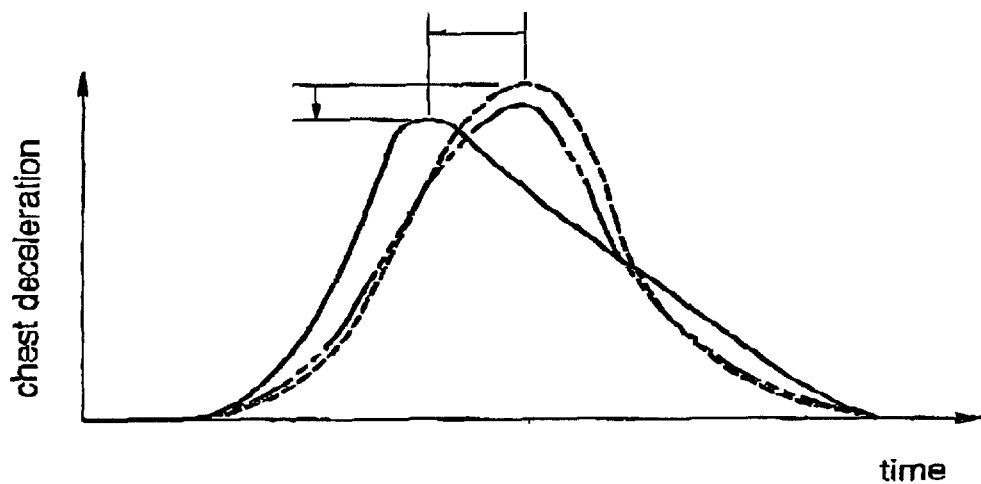
Figure 8C:
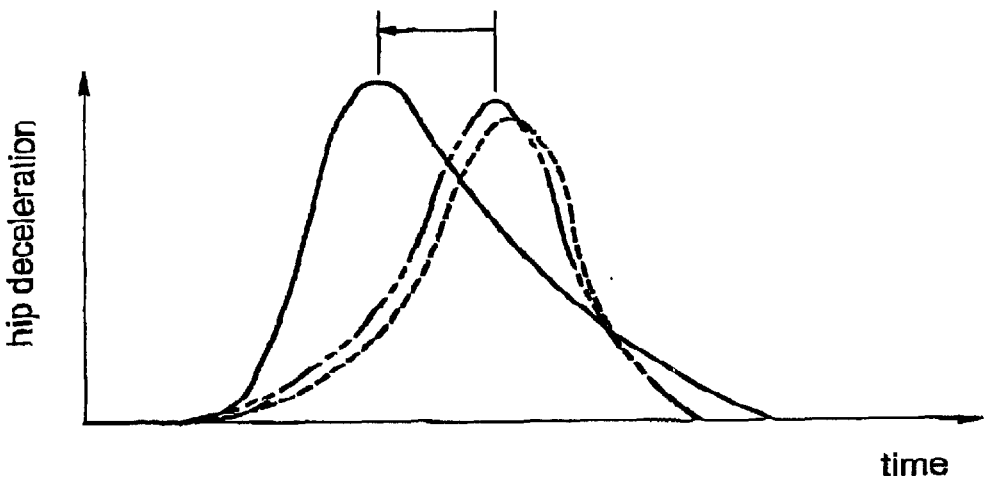

In the experiments conducted by the inventors, a HYBRID-III 50th percentile male dummy was seated in a conventional seat of a compact car, and the vehicle was allowed to make a frontal crash substantially without any slack in the seat belt. Similar experiments were also conducted by using a vehicle seat incorporated with an occupant restraint system according to the present invention. In the graphs shown in FIGS. 8a, 8b and 8c, the broken lines indicate the time histories of deceleration measured at various parts of the vehicle occupant at the time of a vehicle crash when only a seat belt is used and no arrangement is made to restrain the thighs of the vehicle occupant, and the solid lines indicate the time histories of deceleration measured at various parts of the vehicle occupant at the time of a vehicle crash when the vehicle occupant restraint system according to the present invention described above was used in combination with a seat belt.

The double-chain-dot lines indicate the time histories of deceleration measured at various parts of the vehicle occupant at the time of a vehicle crash when the vehicle occupant restraint system which is similar to the present invention but is adapted to raise a front end of the vehicle seat bottom was used in combination with a seat belt. According to the experiments conducted by the inventors, it was found that the restraining the front end of the vehicle seat or a lower part of the thigh bones (femurs) of the vehicle occupant is not as effective as one would like to expect. It is believed that restraining a part of the thigh bones near the hip joints is more effective in restraining the vehicle occupant than restraining a part of the thigh bones near the knee joints. It is also important to determine the vertical height of the deployed position of the restraining member 13 in relation to the ischium of the vehicle occupant so as to prevent the hip of the vehicle occupant from slipping forward in an early phase of a vehicle crash. Such a slipping causes the seat belt to restrain the chest of the vehicle occupant before the hip of the vehicle occupant is restrained by the restraining member, and prevents the desired minimization of the maximum value of the deceleration that is applied to the vulnerable part of the human body.

In the embodiment described above, the vehicle occupant restraint system comprised a passive subassembly and an active subassembly. If desired, it is possible to use two active subassemblies. In this case, it is possible to reduce the size of the power actuator for each active subassembly for a given power required in adequately actuating the restraint system FIG. 9 shows a second embodiment of the present invention in which the subassemblies are oriented differently from those of the previous embodiment. The arms 6 and 16 as well as the restraining member 13 are provided in the rear ends of the subassemblies 4a, and the power actuator 8 is provided in the front end of the active subassembly 4a. In this case, the inertia of the vehicle occupant at the time of a frontal crash tends to raise the restraining member 13 as opposed to the foregoing embodiment. Therefore, according to this embodiment, the power that is required to deploy the restraining member 13 may be reduced.

Also, even when the position for deploying the restraining member 13 is in a relatively rear part of the seat bottom, according to this embodiment, the subassembly would not interfere with the frame or other structure of the seat bottom. By proper selection of the geometry of the arms 6 and 16, it is possible to eliminate the need for the one-way lock mechanism because the restraining member 13 may be held in the deployed position as long as the vehicle occupant is subjected to deceleration and continues to apply a pressure to restraining member 13 towards its deployed position.

Although the present invention has been described in terms of preferred embodiments thereof, it is obvious to a person skilled in the art that various alterations and modifications are possible without departing from the scope of the present invention which is set forth in the appended claims.

What is claimed is:

1. A vehicle occupant restraint system for restraining a lower part of a vehicle occupant in a vehicle crash situation, comprising:
   a vehicle seat incorporated with a seat belt;
   a sensor for detecting an impact;
   a restraining member supported by a vehicle seat so as to be moveable from a retracted position concealed inside the seat to a deployed position projecting upward from said retracted position to restrain a forward movement of a hip area of the vehicle occupant;
   said restraining member at said deployed position engaging a frame of said vehicle seat at a location above a top surface of a rear end of said vehicle seat and between about 180 mm and about 350 mm ahead of said rear end of said vehicle seat; and
   a power actuator provided in association with said vehicle seat for actuating said restraining member to said deployed position according to a detection signal from said sensor;
   said power actuator being adapted to deploy said restraining member substantially before said seat belt effectively restrains the vehicle occupant.

2. A vehicle occupant restraint system according to claim 1, wherein a vertical height of said restraining member at said deployed position is above a top surface of a rear end of said vehicle seat, and projects 10 mm or less above an upper surface of the vehicle seat immediately above said restraining member at said deployed position.

3. A vehicle occupant restraint system according to claim 1, wherein said power actuator comprises a cylinder, a piston received therein, and a propellant received in said cylinder for rapidly increasing an inner pressure of said cylinder so as to produce a thrust that will rapidly push said piston out of said cylinder.

4. A vehicle occupant restraint system according to claim 1, wherein said restraining member comprises a laterally extending main member supported by free ends of a pair of arms having base ends pivotally supported by a seat frame.

5. A vehicle occupant restraint system according to claim 4, wherein said pivotally supported base end of each arm is located behind the main part of the restraining member.

6. A vehicle occupant restraint system according to claim 5, wherein said power actuator is located behind of the main part of the restraining member.

7. A vehicle occupant restraint system according to claim 4, wherein said pivotally supported base end of each arm is located ahead of the main part of the restraining member.

8. A vehicle occupant restraint system according to claim 7, wherein said power actuator is located ahead of the main part of the restraining member.

9. A vehicle occupant restraint system according to claim 1, further comprising a one-way lock mechanism for substantially preventing a reversing movement of said restraining member once it is deployed.

10. A vehicle occupant restraint system according to claim 1, wherein said restraining member is moveable from said retracted position to said deployed position in less than about 40 milliseconds.

11. A vehicle occupant restraint system for restraining a lower part of a vehicle occupant in a vehicle crash situation, comprising:
   a vehicle seat incorporated with a seat belt;
   a sensor for detecting an impact;
   a restraining member supported by a vehicle seat so as to be moveable from a retracted position concealed inside the seat to a deployed position projecting upward from said retracted position to restrain a forward movement of a hip area of the vehicle occupant;
   said restraining member at said deployed position engaging a frame of said vehicle seat at a horizontal distance between about 180 mm and about 350 mm from a rear end of said vehicle seat; and
   a power actuator provided in association with said vehicle seat for actuating said restraining member to said deployed position according to a detection signal from said sensor;
   said power actuator being adapted to deploy said restraining member substantially before said seat belt effectively restrains the vehicle occupant.

12. A vehicle occupant restraint system according to claim 11, wherein said restraining member at said deployed position is at least above a top surface of a rear end of said vehicle seat, and projects 10 mm or less above an upper surface of the vehicle seat immediately above said restraining member at said deployed position.

13. A vehicle occupant restraint system for restraining a lower part of a vehicle occupant in a vehicle crash situation, comprising:

a vehicle seat incorporated with a seat belt;

a sensor for detecting an impact;

a restraining member supported by a vehicle seat so as to be moveable from a retracted position concealed inside the seat to a deployed position projecting upward from said retracted position to restrain a forward movement of a hip area of the vehicle occupant;

said restraining member at said deployed position engaging a frame of said vehicle seat at a horizontal distance between about 31% to about 66% of the fore-and-aft length of said vehicle seat from a rear end of said vehicle seat; and a power actuator provided in association with said vehicle seat for actuating said restraining member to said deployed position according to a detection signal from said sensor;

said power actuator being adapted to deploy said restraining member substantially before said seat belt effectively restrains the vehicle occupant.

14. A vehicle occupant restraint system according to claim 13, wherein said restraining member at said deployed position is at least above a top surface of a rear end of said vehicle seat, and projects 10 mm or less above an upper surface of the vehicle seat immediately above said restraining member at said deployed position.

15. A vehicle occupant restraint system according to claim 13, wherein said restraining member at said deployed position is above a top surface of a rear end of said vehicle seat and between about 180 mm and about 350 mm ahead of said rear end of said vehicle seat.

* * * * *